Nov. 29, 1960     E. J. DIEBOLD     2,962,145
ELECTROMAGNETIC CLUTCH
Filed June 4, 1958     2 Sheets-Sheet 1

INVENTOR.
EDWARD J. DIEBOLD
BY
ATTORNEYS

Nov. 29, 1960   E. J. DIEBOLD   2,962,145
ELECTROMAGNETIC CLUTCH
Filed June 4, 1958   2 Sheets-Sheet 2
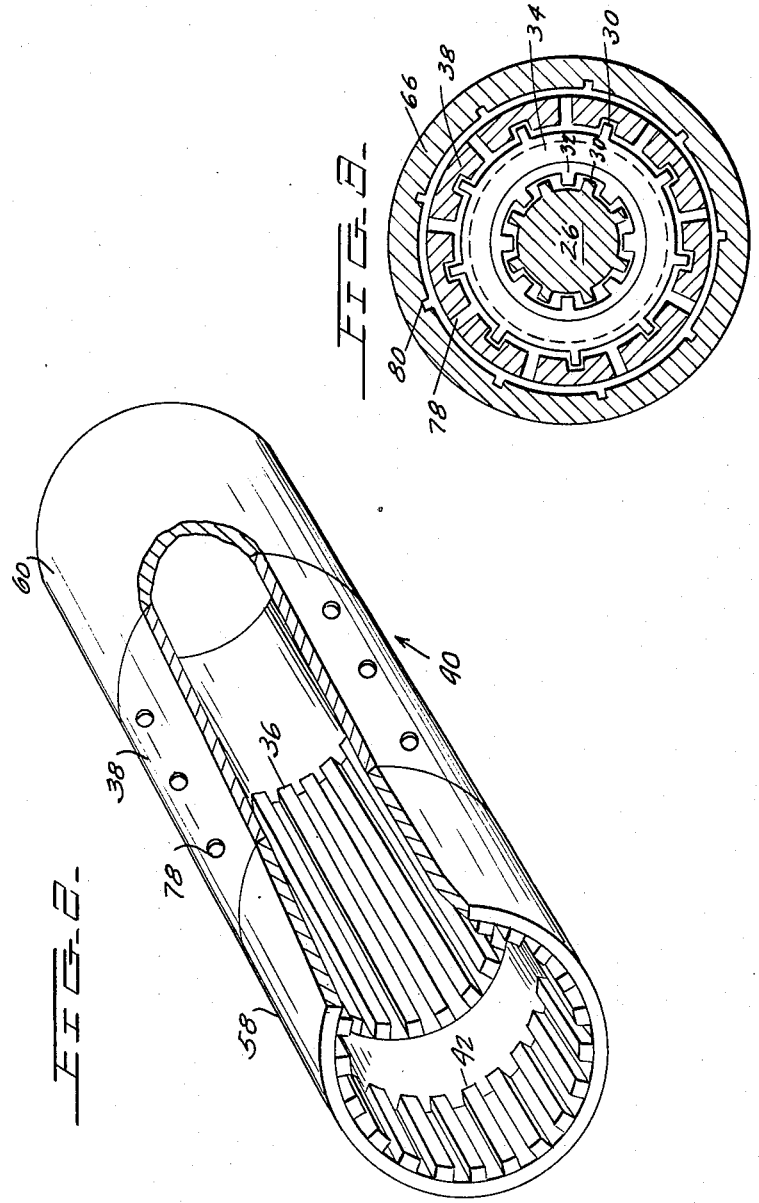
INVENTOR.
EDWARD J. DIEBOLD
BY
ATTORNEYS

United States Patent Office 2,962,145
Patented Nov. 29, 1960

2,962,145

ELECTROMAGNETIC CLUTCH

Edward J. Diebold, Palos Verdes Estates, Calif., assignor to I-T-E Circuit Breaker Company, Philadelphia, Pa., a corporation of Pennsylvania Filed June 4, 1958, Ser. No. 739,794

8 Claims. (Cl. 192—84)

My invention relates to a novel electromagnetic disk clutch wherein the laminations or disks of the stack are terminated by an armature on either side, and the clutch is symmetrical to permit the use of any number of clutch laminations.

Further features of the invention are directed to a novel oil circulating system for the above noted symmetric clutch, as well as a novel unitary outer lamination sleeve which serves to both complete the magnetic circuit of the clutch as well as to support the outer laminations.

Electromagnetic clutches utilizing magnetic laminations as the clutching medium are well known in the art and are described, by way of example, in Patent No. 2,546,250 to A. Ryba, and in my copending application Serial No. 548,801, filed November 25, 1955, entitled "Electromagnetic Clutch With Stationary Coil," and assigned to the assignee of the instant application.

In clutches known heretofore such as those set forth in the above noted references a single armature is utilized to compact a plurality of interlaced magnetic laminations which are alternately connected to a driving member and a driven member. Upon the energization of a magnetic field the armature is so moved as to drive the laminations into frictional engagement with one another so as to form a force transmitting connection from the driving member to the driven member.

However since a single armature was used the outer laminations were connected to the clutch body through a spline which overhangs the clutch laminations from one side of the clutch. This unsymmetrical design limits the number of laminations which can be used in the clutch and, therefore, limits the total torque which the clutch can transmit. That is to say, the stack of laminations was limited in its length by the design of the clutch using an overhanging drive cup or drive bushing. It was further limited by the fact that only a single armature is used to compress the laminations.

The essence of the instant invention is to provide a symmetrical clutch wherein the stack of laminations has an armature on either side thereof. The outer laminations are supported within a cylinder which is coaxial with and positioned between the two armatures, while the inner laminations are supported on the outer surface of a shaft positioned concentrically with the outer lamination cylinder.

In the preferred embodiment of my invention the two armatures are brought together by the generation of a magnetic field from the stationary electromagnetic coil which passes through the laminations in one direction. In this respect, the magnetic field generation means is similar to that disclosed in my above noted copending application Serial No. 548,801.

Since my novel clutch is symmetric and utilizes two armatures, there is no limitation on the number of laminations which may be interposed between the two armatures, and the torque capacity of the clutch may be as large as desired, so long as the design is consistent with economy and size.

Furthermore, my novel device improves the ratio of the active clutching material with respect to the inactive material to thereby improve the heat capacity as well as the torque of the clutch for a given amount of weight.

The novel symmetric design of the clutch leads to many simplifications in the construction of its constituent elements. By way of example, the outer cylinder which contains an inner spline for supporting the outer laminations is to be of non-magnetic material, since it is magnetically in parallel with the magnetic path through the laminations. The two ends of the outer cylinder, however, are preferably of magnetic material so as to complete the magnetic circuit from the magnetic structure which surrounds the top of the cylinder to the magnetic material of the armature and laminations. I have found that these two cylindrical portions of the magnetic circuit and the non-magnetic portion of the cylinder which is to support the laminations may be made of a unitary cylinder in the manner to be described hereinafter.

Further advantages of my novel symmetric clutch lie in possibilities of a simplified lubricating system wherein a lubricant, such as oil, is introduced through the central shaft which carries the inner laminations, and the oil is then impelled outwardly by centrifugal force so as to circulate oil between the clutch laminations when they are open.

Since my novel clutch is symmetric and is directly centered on a main inner shaft which carries the inner laminations with a main outer shaft which carries the outer laminations, there is no wasted space inside the laminations nor outside the laminations, as was the case in the prior art type devices. Accordingly, the clutch will have the absolute minimum diameter so that its ratio of momentum to torque is exceedingly low. Accordingly, it is possible to utilize the clutch on extremely high speed drive systems, such as turbines.

Accordingly, a primary object of my invention is to provide a novel electromagnetic clutch having improved performance characteristics.

Another object of my invention is to provide a novel electromagnetic clutch which is symmetrical.

A further object of my invention is to provide a novel electromagnetic clutch having a stack of magnetic laminations which operate as the clutching medium wherein an armature is provided at each end of the stack of laminations.

Another object of my invention is to provide a novel symmetrical electromagnetic clutch wherein the lamination stack is terminated by an armature at either end, and the outer laminations are supported from an outer cylinder positioned between the two armatures.

Another object of my invention is to provide a novel symmetric electromagnetic clutch in which the height of the stack of laminations is unlimited.

Another object of my invention is to provide a novel symmetric clutch having an extremely low ratio of momentum to torque to permit application of the clutch in high speed systems.

Another object of my invention is to provide a novel symmetrical electromagnetic clutch in which various component parts of the clutch may be subassembled as unitary members.

The further object of my invention is to provide a novel electromagnetic clutch which is symmetric by the use of an armature at either end of the lamination stack, which is operated by a magnetic means which sends a magnetic field through the armatures and their interposed laminations in one direction, and the clutch system lends itself easily to fluid lubrication and cooling.

These and other objects of my invention will become apparent from the following description when taken in connection with the drawings, in which:

Figure 2 is a perspective view of the unitary cylinder which serves as both a portion of the magnetic circuit and the outer lamination support.

Figure 3 is a side cross-sectional view of Figure 1 to particularly illustrate the manner in which the outer and inner laminations cooperate with one another.

Figure 1:
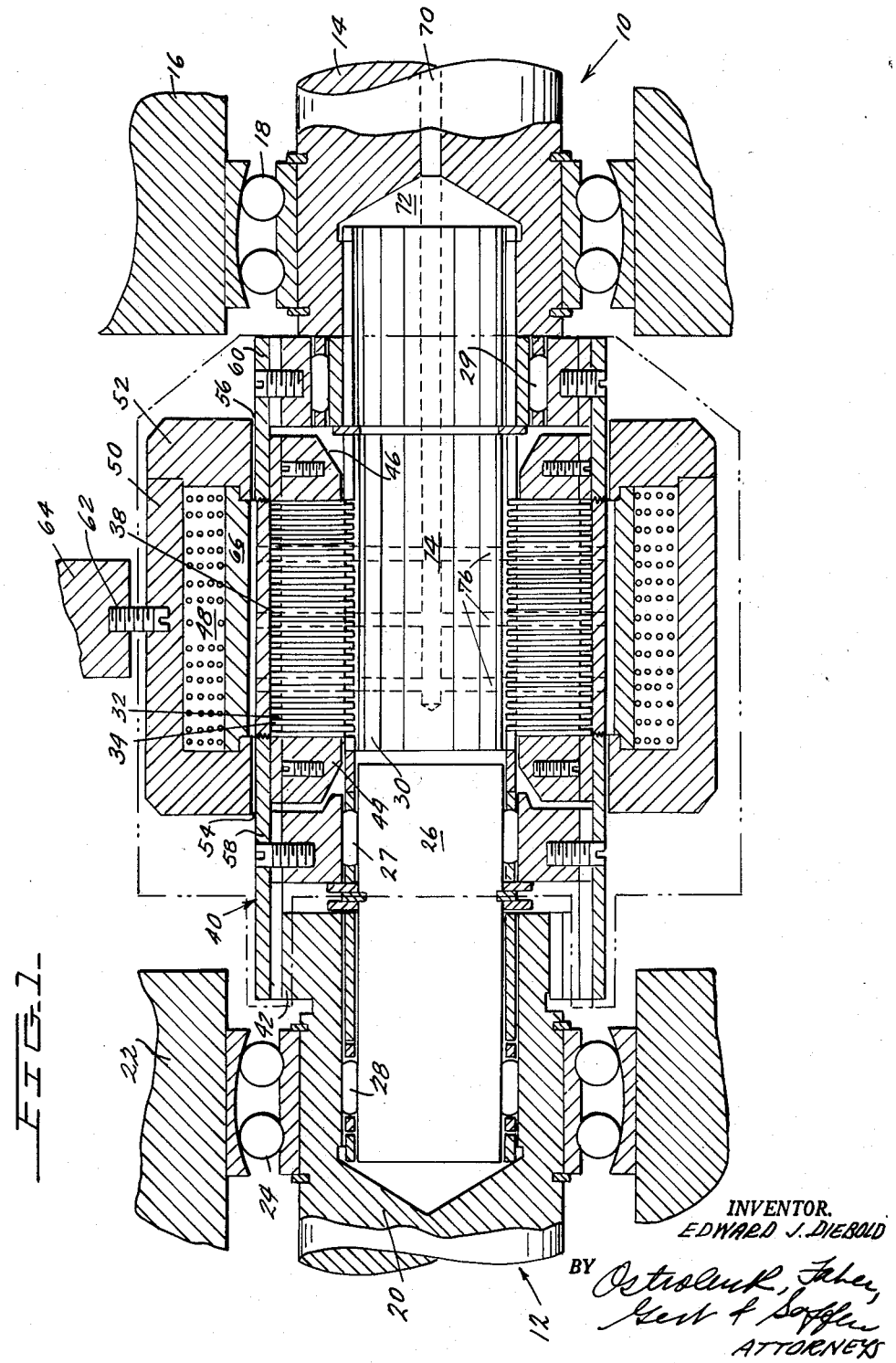
Figure 1 is a side cross-sectional view of the clutch of my novel invention.

Referring now to Figure 1, the novel symmetric clutch of my invention is specifically shown within the dot-dash lines and is positioned between a driving system 10 and a driven system 12. More specifically, shaft 14 of driving system 10 is supported from a stationary support means 16 by ball bearings 18. In a similar manner driven system 12 is comprised of an output shaft 20 which is supported from a fixed support means 22 by ball bearing means 24. For purposes of illustration, system 10 will be considered the driver system in this application, although it will be clear to those skilled in the art that either system 10 or 12 could be the driver and the other the driven system.

The clutch proper is formed of an inner shaft 26 which is rigidly fastened to drive shaft 14 in any desirable manner, and is rotatably supported within shaft 20 by needle bearing means 28. Shaft 26 is further rotatably supported by needle bearings 27 and 29 with respect to the driven portion of the clutch structure to be described hereinafter.

Inner shaft 26, as seen in Figures 1 and 3, has splines on its outer surface, such as spline 30, which carry cooperating gear tooth projections of the inner diameter of the inner laminations, such as inner laminations 32. The outer laminations, such as outer lamination 34, are carried by splines, such as spline 36 (Figure 2) in the inner diameter of non-magnetic sleeve portion 38 of outer cylinder 40.

The lamination stack is thus comprised of alternating inner and outer laminations whereby compression of the laminations will rigidly fasten outer cylinder 40 to inner shaft 26. The left-hand end of outer cylinder 40 is then terminated in an inner spline gear which includes gear tooth 42 of Figures 1 and 2 where the inner gear teeth 42 engage a cooperating gear surface carried by shaft 20. Each end of the stack of laminations is then terminated by a respective armature 44 and 46 which are carried respectively from the outer spline cylinder 38 and the inner shaft 26. Thus, each of the armatures 44 and 46 is axially movable with respect to the lamination stack so as to be capable of compressing the stack, if a magnetic field is passed through the armatures and the stack of laminations.

The magnetic circuit for generating the magnetic field which operates the clutch is energized from coil 48 which is associated with an outer magnetic structure including legs 50 and 52 which terminate in poles 54 and 56, respectively, which lie adjacent magnetic portions 58 and 60 respectively of cylinder 40. The magnetic generating means is then maintained stationary with respect to the rotatable clutch by means of a connecting member, such as screw 62, which connects magnetic leg 50 to a stationary means 64.

Accordingly, the coil 48 may be energized through an energizing circuit which does not require the use of slip rings and brushes which are necessary in the rotating coil type clutch.

A non-magnetic bushing 66 is then provided to act as a support for the coil 48 and is contained within the magnetic structure of legs 50 and 52, and has its outer surface adjacent the inner surface of coil 48.

Accordingly, a magnetic circuit is provided for generating a magnetic flux from pole face 56 through armature 46, the stack of laminations, armature 44, magnetic cylinder 58, and leg 50 of the magnetic circuit. Responsive to this magnetic flux, both armature 44 and armature 46 will be drawn toward one another so as to compress the stack of laminations positioned therebetween, and thus form a rigid connection from driving shaft 14, inner shaft 26, inner laminations, such as lamination 32, outer laminations, such as lamination 34, shaft 40, and driven shaft 20.

When the energizing coil 48 is not energized, however, the laminations, such as laminations 32 and 34 which may have a spring type characteristic imparted thereto so that they are normally biased out of engagement with one another, will not form the above noted force transmitting connection.

From the foregoing description of my novel structure, it is seen that the clutch is completely symmetric. That is to say, the laminations are not supported by an overhanging member, but are supported by a concentric outer and inner shaft. Accordingly, the lamination stack may be made as long as desired, depending upon the required capacity of the clutch.

Furthermore, there is no wasted area on the inside or outside of the laminations. Thus, the clutch diameter may be made extremely small so that the clutch may be operated at extremely high speeds.

As has been described heretofore, my novel symmetric clutch construction permits many simplifications in the component parts thereof. By way of example, the outer cylinder 40 operates both as a non-magnetic spline member for supporting the outer laminations as well as a portion of the magnetic circuit which leads the magnetic flux from the stationary magnetic structure to the armatures 44 and 46 and is a unitary member. This is seen in Figure 2 where cylinder 40 consists of the two magnetic cylinders 58 and 60 which are on either side of the non-magnetic spline carrying portion 38.

Preferably, the complete unitary cylinder 40 is made of a non-magnetic stainless steel for non-magnetic portion 38, and a magnetic steel for portions 58 and 60 where all three of the individual tubes are of similar dimensions.

In construction, the three tubes are first degreased and then positioned adjacent one another with a small foil of copper between them. The tubes are then heated in a hydrogen atmosphere to a temperature sufficient to melt the copper foil. The copper then brazes the three steel parts together to form an intimate brazed joint which is sufficiently strong to allow the unitary piece to be machined as a unitary member, thus allowing a high degree of economy in the manufacture of the complete tube 40.

A further novel feature of this invention is that the torque transmitted from shaft 14 to shaft 20 when the clutch is energized is taken through a minimum of torque transmitting parts. The central shaft 26 which is preferably of a non-magnetic stainless steel permits the transmission of an extremely high torque, while the unitary cylinder 40 which is a strongly bonded unitary member similarly permits a very high torque transmission.

Accordingly, the torque capacity of the clutch need be consistent only with the strength of the inner shaft 26, outer cylinder 40 and the desired number of laminations for this torque capacity.

The bushing 66, which may be of bronze is of a relatively non-critical design, since it is primarily used to close the slot in which the winding 48 is positioned within the stationary magnetic structure. The bushing 66 guides the non-rotating part of the clutch as well as desired, since it is not subjected to any stresses, and although it is a journal bearing, it will be ample to hold the various parts in good alignment.

As has been heretofore mentioned, my novel clutch, because of its symmetric design, lends itself well to oil cooling and lubrication through a central lubrication system.

More specifically, the shaft 14 may have a passage 70 therein for introducing a cooling and lubricating fluid, such as oil, into the clutch body from a fluid source under pressure (not shown). Passage 70 cooperates with a hollow area 72 at the junction of shaft 26 and shaft 14, and the hollow section 72 cooperates with a central passage 74 of shaft 26. Central passage 74 then communicates with radially extending passages 76 of shaft 26 which lead out towards the outer spline surface of shaft 26. When the clutch rotates, the inner spline will always be supplied with oil under pressure which will seep between the play of the spline and the inner laminations, such as lamination 32, to provide lubrication and cooling for the spline. When the clutch is de-energized and the laminations are separated, the oil may then seep from the outside surface of shaft 26 to penetrate between the laminations until it reaches the inner surface of the outer shaft 40.

As is best seen in Figure 2, the outer shaft 40 may be provided with apertures, such as aperture 78, which will allow the oil which has passed between the laminations to circulate to a point external of shaft 40 where it will be captured by the inner surface of bushing 66. The bushing 66 is then provided with a plurality of axial notches, such as notch 80 of Figure 3, which permit flow of the oil from notches 80 through the air gaps between the poles 54 and 56, and magnetic portions 58 and 60 respectively to an area external of the clutch at which point it may flow back into an oil reservoir to be recirculated in the cooling system.

The use of my novel central lubricating system increases the power capacity of the clutch by reducing the amount of heat which is stored after each clutching operation. Thus, the clutch may be operated more frequently without the danger of over-heating.

Furthermore, this novel lubrication system improves the no-load torque of the clutch because of the lubrication between the relatively moving laminations.

Although I have described preferred embodiments of my novel invention, many variations and modifications will now be obvious to those skilled in the art, and I prefer therefore to be limited not by the specific disclosure herein but only by the appended claims.

I claim:

1. An electromagnetic clutch; said electromagnetic clutch comprising a driving member and a driven member; a first plurality of magnetic disks operatively connected to said driving member and a second plurality of magnetic disks fastened to said driven member; the magnetic disks of said first plurality of magnetic disks being alternately positioned with respect to the magnetic disks of said second plurality of magnetic disks to form a stack of interwoven magnetic disks; said disks of said first and second plurality of magnetic disks being movable with respect to one another to be compactable into frictional engagement with respect to one another; a first and second armature of magnetic material; said first and second armatures being positioned on opposite sides of said stack of magnetic disks; a magnetic field generating means; said magnetic field generating means being positioned to generate a magnetic field through said first and second armature and said stack of magnetic disks; said first and second armatures being moved toward one another to compact said stack of magnetic disks responsive to said magnetic field to frictionally couple said driving and driven members.

2. An electromagnetic clutch; said electromagnetic clutch comprising a driving member and a driven member; a first plurality of magnetic disks operatively connected to said driving member and a second plurality of magnetic disks fastened to said driven member; the magnetic disks of said first plurality of magnetic disks being alternately positioned with respect to the magnetic disks of said second plurality of magnetic disks to form a stack of interwoven magnetic disks; said disks of said first and second plurality of magnetic disks being movable with respect to one another to be compactable into frictional engagement with respect to one another; a first and second armature of magnetic material; said first and second armatures being positioned on opposite sides of said stack of magnetic disks; a magnetic field generating means; said magnetic field generating means being positioned to generate a magnetic field through said first and second armature and said stack of magnetic disks; said first and second armatures being moved toward one another to compact said stack of magnetic disks responsive to said magnetic field to frictionally couple said driving and driven members; a hollow cylinder; said hollow cylinder being operatively connected to one of said driving or driven members; at least a portion of the internal surface of said hollow cylinder being splined to receive the said first or second plurality of magnetic disks operatively connected to said one of said driving or driven member connected to said hollow cylinder.

3. An electromagnetic clutch; said electromagnetic clutch comprising a driving member and a driven member; a first plurality of magnetic disks operatively connected to said driving member and a second plurality of magnetic disks fastened to said driven member; the magnetic disks of said first plurality of magnetic disks being alternately positioned with respect to the magnetic disks of said second plurality of magnetic disks to form a stack of interwoven magnetic disks; said disks of said first and second plurality of magnetic disks being movable with respect to one another to be compactable into frictional engagement with respect to one another; a first and second armature of magnetic material; said first and second armatures being positioned on opposite sides of said stack of magnetic disks; a magnetic field generating means; said magnetic field generating means being positioned to generate a magnetic field through said first and second armature and said stack of magnetic disks; said first and second armatures being moved toward one another to compact said stack of magnetic disks responsive to said magnetic field to frictionally couple said driving and driven members; a hollow cylinder; said hollow cylinder being operatively connected to one of said driving or driven members; at least a portion of the internal surface of said hollow cylinder being splined to receive the said first or second plurality of magnetic disks operatively connected to said one of said driving or driven member connected to said hollow cylinder; said hollow cylinder comprising a non-magnetic portion and a first and second magnetic portion; said first and second magnetic portions being adjacent said first and second armatures, said non-magnetic portion receiving said plurality of magnetic disks splined to said internal surface of said hollow cylinder.

4. An electromagnetic clutch; said electromagnetic clutch comprising a driving member and a driven member; a first plurality of magnetic disks operatively connected to said driving member and a second plurality of magnetic disks fastened to said driven member; the magnetic disks of said first plurality of magnetic disks being alternately positioned with respect to the magnetic disks of said second plurality of magnetic disks to form a stack of interwoven magnetic disks; said disks of said first and second plurality of magnetic disks being movable with respect to one another to be compactable into frictional engagement with respect to one another; a first and second armature of magnetic material; said first and second armatures being positioned on opposite sides of said stack of magnetic disks; a magnetic field generating means; said magnetic field generating means being positioned to generate a magnetic field through said first and second armature and said stack of magnetic disks; said first and second armatures being moved toward one another to compact said stack of magnetic disks responsive to said magnetic field to frictionally couple said driving and driven members; a hollow cylinder; said hollow cylinder being operatively connected to one of said driving or driven members; at least a portion of the internal surface of said hollow cylinder being splined to receive the said first or second plurality of magnetic disks operatively connected to said one of said driving or driven member connected to said hollow cylinder; said hollow cylinder comprising a non-magnetic portion and a first and second magnetic portion; said first and second magnetic portions being adjacent said first and second armatures, said non-magnetic portion receiving said plurality of magnetic disks splined to said internal surface of said hollow cylinder; said hollow cylinder being a unitary structure.

5. An electromagnetic clutch; said electromagnetic clutch comprising a driving member and a driven member; a first plurality of magnetic disks operatively connected to said driving member and a second plurality of magnetic disks fastened to said driven member; the magnetic disks of said first plurality of magnetic disks being alternately positioned with respect to the magnetic disks of said second plurality of magnetic disks to form a stack of interwoven magnetic disks; said disks of said first and second plurality of magnetic disks being movable with respect to one another to be compactable into frictional engagement with respect to one another; a first and second armature of magnetic material; said first and second armatures being positioned on opposite sides of said stack of magnetic disks; a magnetic field generating means; said magnetic field generating means being positioned to generate a magnetic field through said first and second armature and said stack of magnetic disks; said first and second armatures being moved toward one another to compact said stack of magnetic disks responsive to said magnetic field to frictionally couple said driving and driven members; a hollow cylinder; said hollow cylinder being operatively connected to one of said driving or driven members; at least a portion of the internal surface of said hollow cylinder being splined to receive the said first or second plurality of magnetic disks operatively connected to said one of said driving or driven member connected to said hollow cylinder; a shaft; said shaft being operatively connected to the other of said driving or driven members; at least a portion of the external surface of said shaft being splined to receive the other of said first or second plurality of magnetic disks.

6. An electromagnetic clutch; said electromagnetic clutch comprising a driving member and a driven member; a first plurality of magnetic disks operatively connected to said driving member and a second plurality of magnetic disks fastened to said driven member; the magnetic disks of said first plurality of magnetic disks being alternately positioned with respect to the magnetic disks of said second plurality of magnetic disks to form a stack of interwoven magnetic disks; said disks of said first and second plurality of magnetic disks being movable with respect to one another to be compactable into frictional engagement with respect to one another; a first and second armature of magnetic material; said first and second armatures being positioned on opposite sides of said stack of magnetic disks; a magnetic field generating means; said magnetic field generating means being positioned to generate a magnetic field through said first and second armature and said stack of magnetic disks; said first and second armatures being moved toward one another to compact said stack of magnetic disks responsive to said magnetic field to frictionally couple said driving and driven members; a hollow cylinder; said hollow cylinder being operatively connected to one of said driving or driven members; at least a portion of the internal surface of said hollow cylinder being splined to receive the said first or second plurality of magnetic disks operatively connected to said one of said driving or driven member connected to said hollow cylinder; a shaft; said shaft being operatively connected to the other of said driving or driven members; at least a portion of the external surface of said shaft being splined to receive the other of said first or second plurality of magnetic disks; said hollow cylinder comprising a non-magnetic portion and a first and second magnetic portion; said first and second magnetic portions being adjacent said first and second armatures, said non-magnetic portion receiving said plurality of magnetic disks splined to said internal surface of said hollow cylinder.

7. A symmetrical electromagnetic clutch; said symmetrical electromagnetic clutch comprising a first and a second independently rotatable member; said first rotatable member comprising a hollow cylinder, said second rotatable member comprising a shaft; said shaft being coaxially and concentrically positioned with respect to said hollow cylinder; a first and second plurality of magnetic disks; said first and second plurality of magnetic disks being positioned to form an interleaved stack positioned within the annular shaped opening between said hollow cylinder and said shaft; the magnetic disks of said stack of magnetic disks being axially movable with respect to said shaft and said hollow cylinder; said first plurality of magnetic disks being operatively connected to the internal surface of said hollow cylinder to be rotatable therewith; said second plurality of magnetic disks being operatively connected to the external surface of said shaft to be rotatable therewith; a magnetic field generating means and a stack compressing means associated therewith; said stack compressing means being operatively connectable to said stack of magnetic disks, said stack compressing means being movable responsive to the energization of a magnetic field by said magnetic field generating means to compress said stack of magnetic disks to thereby frictionally couple said hollow cylinder and said shaft; said stack compressing means comprising a first and second magnetic armature positioned on opposite sides respectively of said stack of magnetic disks; said hollow cylinder comprising a non-magnetic portion and a first and second magnetic portion; said first and second magnetic portions being positioned adjacent said first and second armatures; said non-magnetic portion receiving said first plurality of magnetic disks.

8. A symmetrical electromagnetic clutch; said symmetrical electromagnetic clutch comprising a first and a second independently rotatable member; said first rotatable member comprising a hollow cylinder, said second rotatable member comprising a shaft; said shaft being coaxially and concentrically positioned with respect to said hollow cylinder; a first and second plurality of magnetic disks; said first and second plurality of magnetic disks being positioned to form an interleaved stack positioned within the annular shaped opening between said hollow cylinder and said shaft; the magnetic disks of said stack of magnetic disks being axially movable with respect to said shaft and said hollow cylinder; said first plurality of magnetic disks being operatively connected to the internal surface of said hollow cylinder to be rotatable therewith; said second plurality of magnetic disks being operatively connected to the external surface of said shaft to be rotatable therewith; a magnetic field generating means and a stack compressing means associated therewith; said stack compressing means being operatively connectable to said stack of magnetic disks, said stack compressing means being movable responsive to the energization of a magnetic field by said magnetic field generating means to compress said stack of magnetic disks to thereby frictionally couple said hollow cylinder and said shaft; said stack compressing means comprising a first and second magnetic armature positioned on opposite sides respectively of said stack of magnetic disks; said hollow cylinder comprising a non-magnetic portion and a first and second magnetic portion; said first and second magnetic portions being positioned adjacent said first and second armatures; said non-magnetic portion receiving said first plurality of magnetic disks; said hollow cylinder being a unitary body.

(References on following page)

References Cited in the file of this patent

UNITED STATES PATENTS

| | | |
|---|---|---|
| 942,188 | Ravenshaw | Dec. 7, 1909 |
| 1,928,301 | Pierson | Sept. 26, 1933 |
| 2,209,776 | Kiekhaefer | July 30, 1940 |
| 2,305,788 | Kemmler et al. | Dec. 22, 1942 |
| 2,407,699 | Hill | Sept. 17, 1946 |
| 2,620,900 | Du Rostu | Dec. 9, 1952 |
| 2,698,679 | Vernhes | Jan. 4, 1955 |
| 2,816,454 | Hosea et al. | Dec. 17, 1957 |
| 2,847,102 | Tiedeman | Aug. 12, 1958 |
| 2,862,590 | Schuman | Dec. 2, 1958 |

FOREIGN PATENTS

| | | |
|---|---|---|
| 252,231 | Italy | Mar. 5, 1927 |
| 516,963 | Great Britain | Jan. 16, 1940 |
| 640,287 | Great Britain | July 19, 1950 |